United States Patent [19]

Kuznicki et al.

[11] Patent Number: 4,994,191
[45] Date of Patent: Feb. 19, 1991

[54] REMOVAL OF HEAVY METALS, ESPECIALLY LEAD, FROM AQUEOUS SYSTEMS CONTAINING COMPETING IONS UTILIZING WIDE-PORED MOLECULAR SIEVES OF THE ETS-10 TYPE

[75] Inventors: Steven M. Kuznicki; Kathleen A. Thrush, both of Easton, Pa.

[73] Assignee: Engelhard Corporation, Iselin, N.J.

[21] Appl. No.: 529,087

[22] Filed: May 25, 1990

Related U.S. Application Data

[63] Continuation-in-part of Ser. No. 416,613, Oct. 10, 1989, abandoned.

[51] Int. Cl.$^5$ .............................................. C02F 1/28
[52] U.S. Cl. .................................. 210/688; 210/912; 210/913; 210/914
[58] Field of Search ...................... 210/688, 912–914

[56] References Cited

U.S. PATENT DOCUMENTS

| | | | |
|---|---|---|---|
| 2,653,089 | 9/1953 | Brooke | 210/688 |
| 4,711,718 | 12/1987 | Nelson | 210/688 |
| 4,746,439 | 5/1988 | Newman | 210/688 |

*Primary Examiner*—Ivars Cintins

[57] ABSTRACT

A process for the removal of heavy metals such as lead, cadmium, zinc, chromium, arsenic and mercury from aqueous solutions containing one or more of said metals as well as competing ions such as calcium and/or magnesium by contacting said aqueous solution with a crystalline molecular sieve having the X-ray diffraction patterns of ETS-10 or ETAS-10.

10 Claims, No Drawings

REMOVAL OF HEAVY METALS, ESPECIALLY LEAD, FROM AQUEOUS SYSTEMS CONTAINING COMPETING IONS UTILIZING WIDE-PORED MOLECULAR SIEVES OF THE ETS-10 TYPE

CROSS-REFERENCE TO RELATED APPLICATIONS

This application is related to Ser. No. 07/373,855, filed June 29, 1989, entitled Large-Pored Molecular Sieves with Charged Octahedral Titanium and Charged Tetrahedral Aluminum Sites and is a continuation-in-part of application Ser. No. 07/416,613, filed Oct. 10, 1989, now abandoned.

BACKGROUND OF THE INVENTION

The use of ion exchangers, both organic and inorganic, including crystalline molecular sieve zeolites, in order to remove certain metals from aqueous solutions is notoriously old in the art and the patent and technical literature contains many examples of such techniques. Although molecular sieves generally are effective for the removal of certain cations, nevertheless, when competing cations are present in the aqueous solution, a molecular sieve will function normally to the point at which the metal which is desirous of being removed effectively occupies some portion of the ionic sites in said zeolite. Thereafter, the zeolite must either be discarded or regenerated.

A very practical use for the above type of operation is in the home water softening industry wherein an ion exchanger of the organic or inorganic type is contacted with water until the calcium and magnesium ions which are inherently present in most mineral water replaces the ion originally associated with the ion exchanger, usually sodium. At this point, the ion exchanger has to be regenerated and this is usually accomplished by back-washing, or back-flushing, or otherwise contacting the ion exchanger with a solution of a different cation than that which was removed from the water, i.e., usually sodium in the form of sodium chloride. The sodium exchanges for the calcium/magnesium in the spent ion exchanger and the cycle is ready to start anew.

In evaluating the properties of a suitable ion exchanger, it is quite obvious that the environment in which it works to remove the unwanted metal or metals is of extreme importance and its susceptibility to competing ions is of paramount importance in obtaining a practical exchanger as opposed to one that is merely a scientific curiosity.

Thus, for example, in industrial processes wherein heavy metals are present in contaminated aqueous solutions, such heavy metals are not ordinarily present by themselves because the water contains other minerals, particularly calcium and magnesium. Thus for an ion exchanger to be practical in the contact of industrial waste streams containing heavy metals, it is necessary that the ion exchanger be sufficiently selective towards heavy metals versus magnesium or calcium which compete for the ion exchange sites in the zeolite.

Another significant area where ion exchangers can be utilized is in the field of drinking water. The contamination of drinking water by toxic heavy metals, especially lead, has become a topic of great interest in both the scientific and popular press.

The Environmental Protection Agency (EPA) has stated that there is no threshold level of lead below which water is considered safe for human consumption. The EPA estimates that 138 million residents in the United States are potentially at risk from some degree of lead poisoning.

Sources of lead contamination include industrial waste as well as lead-bearing solders and other components found in the plumbing of most homes and water coolers.

There are various techniques utilized for the removal of lead, such as precipitation techniques. Such processes while effective in bulk removal are ineffective in reducing lead levels below about 50 ppb, an unacceptable level for human consumption. Other potential options for lead removal include purification of contaminated streams by exposure to synthetic ion exchange resins or various absorbents such as activated carbon. These systems typically suffer from low dynamic metal capacities, low lead selectivities and unacceptably slow rates of metal removal.

The Environmental Protection Agency has made the radical proposal of reducing the corrosivity of potable water by making all drinking water alkaline with the intent of reducing the leaching of lead from plumbing components. In addition to the high cost and massive social intrusion, the quality and taste of drinking water in this country is expected to decline from what the public has been accustomed to. In addition, it has not yet been proven that this action alone is sufficient to solve the national lead contamination problem.

Cation exchange represents one potential avenue for the removal of many cationic metal species from aqueous systems. As indicated earlier, crystalline inorganic molecular sieves form the basis of hundreds of commercial ion exchange processes. Each individual molecular sieve demonstrates characteristic preferences of selectivities towards certain counterbalancing ions when exposed to mixed solutions and, thus, the separation or isolation of certain cations may be accomplished by the exposure to mixed cationic solutions to specifically tailored molecular sieves In pending application Ser. No. 07/373,855, previously referred to, there is disclosed and claimed the use of a material designated as ETAS-10 for the removal of heavy metals including lead from aqueous systems. However, what is not specifically taught in said copending application is the use of such a material for the removal of lead from aqueous systems in the presence of competing ions such as calcium and magnesium.

It has now been discovered that certain large-pored molecular sieves of the ETS-10 type, which contain octahedrally active charged sites, demonstrate remarkable rates of uptake for heavy metal species such as lead, cadmium, zinc, chromium, arsenic and mercury which are orders of magnitude greater than prior art absorbents or ion exchangers under the conditions tested which include the presence of competing ions such as calcium and magnesium. The combination of extraordinary lead selectivities, capacity and uptake rates, allows such materials to strip lead from aqueous streams with minimal contact time allowing direct end use in filters for water purification.

DESCRIPTION OF THE INVENTION

The expression "ETS-10 type" is intended to mean crystalline molecular sieve zeolites having octahedrally coordinated active charged sites in the lattice framework and containing both silica and titanium in the framework structure and corresponding to the X-ray diffraction pattern which will be later set forth. ETS-10 is disclosed and claimed in U.S. Pat. No. 4,853,202. ETAS-10 is disclosed and claimed in aforementioned copending application Ser. No. 07/373,855, filed June 29, 1989. The entire disclosure of said pending application and patent are herein incorporated by reference.

As is disclosed in U.S. Pat. No. 4,853,202, ETS-10 is a crystalline titaniumsilicate molecular sieve having a pore size of approximately 8 Angstrom units and having a composition in terms of mole ratio of oxide as follows:

$$1.0 \pm 0.25 \; M_{2/n}O : TiO_2 : y \; SiO_2 : z \; H_2O$$

wherein M is at least one cation having a valence of n, y is from 2.5 to 25, and z is from 0 to 100 said zeolite being characterized by an X-ray powder diffraction pattern having the lines and relative intensities set forth below:

TABLE 1

| XRD POWDER PATTERN OF ETS-10 (0–40° 2 theta) | |
|---|---|
| Significant d-Spacing (Angs.) | I/Io |
| 14.7 ± .35 | W–M |
| 7.20 ± .15 | W–M |
| 4.41 ± .10 | W–M |
| 3.60 ± .05 | VS |
| 3.28 ± .05 | W–M |

In the above table,
VS = 60–100
S = 40–60
M = 20–40
W = 5–20

ETAS-10, as disclosed and claimed in application Ser. No. 07/373,855, filed June 29, 1989, has a pore size of approximately 9 Angstrom units and a composition in terms of mole ratio of oxide as follows:

$$\left(1 + \frac{x}{2}\right)(1.0 \pm 0.25 \; M_{2/n}O) : x \; AlO_2 : TiO_2 : y \; SiO_2 : z \; H_2O$$

wherein M is at lest one cation having a valence of n, y is from 2.0 to 100, x is from 0.05 to 5.0 and z is from 0 to 100. In a preferred embodiment, M is a mixture of alkali metal cations, particularly sodium and potassium, and y is at least 2.0 and ranges up to about 10.

Members of the ETAS-10 family of molecular sieve zeolites have a crystalline structure and an X-ray powder diffraction pattern having the following significant lines:

TABLE 2

| XRD POWDER PATTERN OF ETAS-10 0–40° 2 theta | |
|---|---|
| Significant d-Spacing (Angs.) | I/Io |
| 14.7 − .50 + 1.0 | W–M |
| 7.20 ± .15 (optional) | W–M |
| 4.41 − .05 + 0.25 | W–M |
| 3.60 − .05 + 0.25 | VS |
| 3.28 − .05 + .2 | M–S |

In the above table,
VS = 60–100
S = 40–60
M = 20–40
W = 5–20

Various cation forms, e.g., sodium, hydrogen, calcium, of the compositions having the above-identified X-ray patterns can be used but the as-synthesized form is preferred.

ETAS-10 molecular sieves can be prepared from a reaction mixture containing a titanium source such as titanium trichloride with an aluminum source such as aluminum chloride, a source of silica, a source of alkalinity such as an alkali metal hydroxide, water and, optionally, an alkali metal fluoride mineralizer having a composition in terms of mole ratios falling within the following ranges.

TABLE 3

| | Broad | Preferred | Most Preferred |
|---|---|---|---|
| $SiO_2/Al$ | 1–200 | 2–100 | 2–20 |
| $SiO_2/Ti$ | 2–20 | 2–10 | 2–7 |
| $H_2O/SiO_2$ | 2–100 | 5–50 | 10–25 |
| $M_n/SiO_2$ | 0.1–20 | 0.5–5 | 1–3 | wherein M indicates the cations of valence n derived from the alkali metal hydroxide and potassium fluoride and/or alkali metal salts used for preparing the titanium silicate according to the invention. The reaction mixture is heated to a temperature of from about 100° C. to 250° C. for a period of time ranging from about 2 hours to 40 days, or more. The hydrothermal reaction is carried out until crystals are formed and the resulting crystalline product is thereafter separated from the reaction mixture, cooled to room temperature, filtered and water washed. The reaction mixture can be stirred although it is not necessary. It has been found that when using gels, stirring is unnecessary but can be employed. When using sources of titanium which are solids, stirring is beneficial. The preferred temperature range is 150° C. to 225° C. for a period of time ranging from 4 hours to 4 days. Crystallization is performed in a continuous or batchwise manner under autogenous pressure in an autoclave or static bomb reactor. Following the water washing step, the crystalline ETAS-10 is dried at temperatures of 100° F. to 600° F. for periods up to 30 hours.

The method for preparing ETAS-10 compositions comprises the preparation of a reaction mixture constituted by sources of silica, sources of alumina, sources of titanium, sources of alkalinity such as sodium and/or potassium oxide and water having a reagent molar ratio composition as set forth in Table 3. Optionally, sources of fluoride such as potassium fluoride can be used, particularly to assist in solubilizing a solid titanium source such as $Ti_2O_3$. However, when titanium aluminum silicates are prepared from gels, its value is diminished.

It is to be understood that prior to crystallization, the gel resulting from the reaction mixture can be subjected to one or more thermal treatments at temperatures of from about 150° C. to 800° C. for 1–48 hours. The thermally treated gel is mixed with water and crystallized into ETAS-10.

Quite obviously, it is possible to use less caustic or other reactants in the gel than set forth in Table 3 and supply these during the crystallization step after the gel has been thermally treated.

The silica source includes most any reactive source of silicon such as silica, clay, silica hydrosol, silica gel, silicic acid, alkoxides of silicon, alkali metal silicates, preferably sodium or potassium, or mixtures of the foregoing.

The titanium oxide source is trivalent or tetravalent and compounds such as titanium trichloride, $TiCl_3$, titanium tetrachloride, $TiCl_4$, or titanium oxychloride, $TiOCl_2$ can be used.

The aluminum source can include sodium aluminate, aluminum salts such as aluminum chloride, as well as solid sources of soluble alumina, such as alumina, metakaolin, etc.

The source of alkalinity is preferably an aqueous solution of an alkali metal hydroxide, such as sodium hydroxide, which provides a source of alkali metal ions for maintaining electrovalent neutrality and controlling the pH of the reaction mixture within the range of 10.0 to 12.0 using the techniques elaborated in U.S. Pat. No. 4,853,202. As shown in the examples hereinafter, pH is critical for the production of ETAS-10. The alkali metal hydroxide serves as a source of sodium oxide which can also be supplied by an aqueous solution of sodium silicate.

The crystalline titanium-aluminum-silicates as synthesized can have original components thereof replaced by a wide variety of other components according to techniques well known in the art. Typical replacing components would include hydrogen, ammonium, alkyl ammonium and aryl ammonium and metals, including mixtures of the same. The hydrogen form may be prepared, for example, by substitution of original sodium with ammonium or by the use of a weak acid. The composition is then calcined at a temperature of, say, 1000° F. causing evolution of ammonia and retention of hydrogen in the composition, i.e., hydrogen and/or decationized form. Of the replacing metals, preference is accorded to metals of Groups II, IV and VIII of the Periodic Table, preferably the rare earth metals.

The crystalline titanium-aluminum-silicates are then preferably washed with water and dried at a temperature ranging from about 100° F. to about 600° F. and thereafter calcined in air or other inert gas at temperatures ranging from 500° F. to 1500° F. for periods of time ranging from ½ to 48 hours or more.

Regardless of the synthesized form of the titanium silicate, ETAS-10, the spatial arrangement of atoms which form the basic crystal lattices remain essentially unchanged by the replacement of sodium or other alkali metal or by the presence in the initial reaction mixture of metals in addition to sodium, as determined by an X-ray powder diffraction pattern of the resulting titanium silicate. The X-ray diffraction patterns of such products are essentially the same as those set forth in Table 2 above (with the exception that the 7.20±0.15 Å line is sometimes not observed).

The crystalline titanium-aluminum-silicates are formed in a wide variety of particular sizes. Generally, the particles can be in the form of powder, a granule, or a molded product such as an extrudate having a particle size sufficient to pass through a 2 mesh (Tyler) screen and be maintained on a 400 mesh (Tyler) screen in cases where the catalyst is molded such as by extrusion. The titanium silicate can be extruded before drying or dried or partially dried and then extruded.

Sometimes it is desired to incorporate the crystalline titanium-aluminum-silicate with other materials. Such materials include inorganic materials such as clays, silica and/or metal oxides. The later may be either naturally occurring or in the form of gelatinous precipitates or gels including mixtures of silica and metal oxides Normally, crystalline materials have been incorporated into naturally occurring clays, e.g., bentonite, attapulgite and kaolin to improve the crush strength and other physical properties. These materials, i.e., clays, oxides, etc., function as binders.

Naturally occurring clays that can be composited with the crystalline titanium silicate described herein include the smectite and kaolin families, which families include the montmorillonites such as sub-bentonites and the kaolins in which the main constituent is kaolinite, halloysite, dickite, nacrite or anauxite and the palygorskite clays such as attapulgite and sepeolite. Such clays can be used in the raw state after conventional gritting or they can be subjected to additional processing such as calcination, acid treatment or chemical modification.

In addition to the foregoing materials, the crystalline titanium silicate may be composited with matrix materials such as silica-alumina, silica-magnesia, silica-zirconia, silica-thoria, silica-berylia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline metal organosilicate and inorganic oxide gel matrix can vary widely with the crystalline organosilicate content ranging from about 1 to 90 percent by weight and more usually in the range of about 2 to about 50 percent by weight of the composite.

In addition to the above, the crystalline titanium silicate, ETAS-10, can be incorporated with a matrix by employing in-situ techniques. Thus, for example, a forming solution can be prepared as previously described, or the forming solution can contain no aluminum or less aluminum than set forth in Table 3. Quite obviously, it can also contain less silica or caustic.

A mixture is formed, as previously described, and to it is added a reactive clay such as metakaolin. The mixture is blended, seeds may be added and sufficient water introduced in order to be able to spray dry the mixture into microspheres. The microspheres are converted to ETAS-10 zeolites by adding an aqueous solution of caustic, caustic silicate or water (if sufficient caustic is present) and crystallizing the same in an autoclave under autogenous pressure. It is obvious that a portion of the metakaolin can supply a source of aluminum and/or silica.

The following Examples will now illustrate the best mode contemplated for carrying out the novel process of this invention.

EXAMPLE 1

Activated carbons represent the current "state of the art" in the removal of lead by adsorption and are currently marketed for this application even though their limitations are well known to those in the field.

Approximately 100 bed volumes of 2,000 ppm lead solution was exposed to 2.4g samples of activated carbon taken directly from a water purification filter claimed to be effective in lead removal. The carbon was finely powdered (nominally 200 mesh) in order to eliminate diffusion limitations as a potential cause of poor performance. To eliminate hydrolysis which is a patented means of lead removal, the pH of the carbon in water was measured. Since the pH of the water containing activated carbon was found to be neutral to slightly acidic, it was deemed unnecessary to adjust the solution in order to preclude hydrolysis as a means of lead extraction. The amount of lead added was gauged to yield a loading of approximately 10 wt. % Pb on the air-equilibrated (i.e., hydrated) sample, if the lead were completely "adsorbed".

Two and four-tenths (2.4) gram samples of air-equilibrated powdered activated carbon were equilibrated with 50 grams of deionized water, the resultant solution was stirred with a magnetic stirrer To the suspensions were added 50 grams lots of 4000 ppm Pb solution (as Pb(NO$_3$)$_2$). The lead/adsorbent mixtures were stirred using a magnetic stirrer for predetermined time intervals and then rapidly vacuum filtered to separate the adsorbent from the "purified" solution Lead concentrations remaining in the "purified" solutions after various contact times are presented as Table 4.

TABLE 4

| CONTACT TIME | Pb REMAINING IN SOLUTION (PPM METAL) |
|---|---|
| 0 | 2000 |
| 10 sec | 1769 |
| 1 min | 1756 |
| 5 min | 1590 |
| 15 min | 1513 |
| 60 min | 1410 |

The commercial carbon adsorbent demonstrated low lead selectivity, low lead capacity and most importantly for fast flow systems, low rates of lead removal.

EXAMPLE 2

Approximately 100 bed volumes of 2,000 ppm lead solution was exposed to an organic ion exchange resin noted for high lead selectivity, Amberlite® DP-1 Since the pH of the water containing resin was neutral to slightly acidic, it was deemed unnecessary to pre-acidify the solution in order to preclude hydrolysis as a means of lead extraction. The amount of lead added was gauged to yield a loading of approximately 10 wt. % Pb on the air-equilibrated (i.e., hydrated) sample, if the lead were completely "adsorbed".

Two and four-tenths (2.4) gram samples of as-received Amberlite® DP-1 ion exchange resin were equilibrated with 50 grams of deionized water, the resultant suspensions were stirred with a magnetic stirrer. To these suspensions were added 50 grams lots of 4000 ppm Pb solution (as Pb(NO$_3$)$_2$). The lead/"adsorbent" mixtures were stirred using a magnetic stirrer for predetermined time intervals and then rapidly vacuum filtered to separate the "adsorbent" from the "purified" solution. Lead concentrations remaining in the "purified" solutions after various contact times are presented as Table 5.

TABLE 5

| CONTACT TIME | Pb REMAINING IN SOLUTION (PPM METAL) |
|---|---|
| 0 | 2000 |
| 10 sec | 1670 |
| 1 min | 1429 |
| 5 min | 857 |
| 15 min | 369 |
| 60 min | 30 |

While clearly demonstrating the expected lead selectivity and much higher lead capacity in comparison to activated carbon, the organic resin removed lead at a rate unacceptably slow for rapid flow purification systems where, at most, seconds of contact time are available.

EXAMPLE 3

Approximately 100 bed volumes of 2,000 ppm lead solution was exposed to the inorganic ion exchange agent zeolite A. Zeolite A demonstrates the highest available ion exchange capacity available in aluminosilicate zeolitic materials and is extensively employed as a ion-exchange agent. Since cation exchange agents such as zeolite A removed H. from water to some degree, the zeolite bearing solutions were pH adjusted to approximately 6 with nitric acid in order to preclude hydrolysis as a means of lead removal. The amount of lead added was gauged to yield a loading of approximately 10 wt. % Pb on the air-equilibrated (i.e., hydrated) sample, if the lead were completely "adsorbed".

Two and four-tenths (2.4) gram samples of air-equilibrated powdered Zeolite A were equilibrated with 50 grams of pre-acidified solution so as to generate a solution pH of approximately 6 and stirred with a magnetic stirrer. To these "neutralized" mixtures were added 50 grams lots of 4000 ppm Pb solution (as Pb(NO$_3$)$_2$). The lead/"adsorbent" mixtures were stirred using a magnetic stirrer for predetermined time intervals and then rapidly vacuum filtered to separate the "adsorbent" from the "purified" solution Lead concentrations remaining in the "purified" solutions after various contact times are presented as Table 6.

TABLE 6

| CONTACT TIME | Pb REMAINING IN SOLUTION (PPM METAL) |
|---|---|
| 0 | 2000 |
| 10 sec | 1575 |
| 1 min | 1225 |
| 5 min | 425 |
| 15 min | 1 |
| 60 min | 1 |

Zeolite A demonstrates even greater selectivity and capacity than the organic ion exchange resin of the previous example. However, as in the previous example, the inorganic ion exchanger removed lead at a rate unacceptably slow for rapid flow purification systems where, at most, seconds of contact time are available.

EXAMPLE 4

On the hypothesis that pore size was hindering the rate of lead uptake in the previous example, large-pored zeolite X was utilized as the test ion exchanger. Zeolite X is also known to be extremely lead selective, by aluminosilicate zeolite standards and therefor appeared to represent an optimal aluminosilicate zeolite for lead removal.

Approximately 100 bed volumes of 2,000 ppm lead solution was exposed to the ion exchanger in a pre-acidified condition, in order to preclude hydrolysis as a means of lead extraction. Nitric acid was used for acidification. The amount of lead added was gauged to yield a loading of approximately 10 wt. % Pb on the air-equilibrated (i.e., hydrated) sample, if the lead were completely "adsorbed".

Two and four-tenths (2.4) gram samples of air-equilibrated powdered Zeolite X were equilibrated with 50 grams of pre-acidified solution so as to generate a solution pH of approximately 6 and stirred with a magnetic stirrer. To these acidified mixtures were added 50 grams lots of 4000 ppm Pb solution (as Pb(NO$_3$)$_2$). The lead/-"adsorbent" mixtures were stirred using a magnetic stirrer for predetermined time intervals and then rapidly vacuum filtered to separate the "adsorbent" from the "purified" solution Lead concentrations remaining in the "purified" solutions after various contact times are presented as Table 7.

TABLE 7

| CONTACT TIME | Pb REMAINING IN SOLUTION (PPM METAL) |
|---|---|
| 0 | 2000 |
| 10 sec | 385 |
| 1 min | 122 |
| 5 min | not det. |
| 15 min | not det. |
| 60 min | not det. |

While far and away the most superior prior art material tested, it still appears that Zeolite X removed lead at a rate unacceptably slow for rapid flow purification systems where, at most, seconds of contact time are available.

SUMMARY OF EXAMPLES 1–4

The commercial adsorbents and ion exchangers tested all demonstrated significant lead capacity and in the case of the ion exchange agents significant lead selectivity. Unfortunately, all test materials require minutes to effectively strip lead from solution, not the seconds or fraction thereof available for contact in fast flow water purification systems.

EXAMPLES 5–7

The examples below demonstrate that large pored molecular sieves such as ETS-10 and structurally related materials demonstrate remarkably rapid uptake rates in combination with high lead selectivity and capacity, making them applicable to short contact time purification processes. Substantial quantities of metal are stripped from solution essentially on contact by these wide pored materials, especially ETAS-10.

EXAMPLE 5

This example demonstrates the removal of substantial quantities of lead from solution by small pored titanium-silicate molecular sieve ETS-4. Although lead removal was substantial, the rate of removal is seen to be insufficient for short contact time processes.

Approximately 100 bed volumes of 2,000 ppm lead solution was exposed to the ion exchanger in a pre-acidified condition, in order to preclude hydrolysis as a means of lead extraction. Nitric acid was used for acidification. The amount of lead added was gauged to yield a loading of approximately 10 wt. % Pb on the air-equilibrated (i.e., hydrated) sample, if the lead were completely "adsorbed".

Two and four-tenths (2.4) gram samples of air-equilibrated ETS-4 were equilibrated with 50 grams of pre-acidified solution so as to generate a solution pH of approximately 6 and stirred with a magnetic stirrer. To these acidified mixtures were added 50 grams lots of 4000 ppm Pb solution (as $Pb(NO_3)_2$). The lead/"adsorbent" mixtures were stirred using a magnetic stirrer for predetermined time intervals and then rapidly vacuum filtered to separate the "adsorbent" from the "purified" solution. Lead concentrations remaining in the "purified" solutions after various contact times are presented as Table 8.

TABLE 8

| CONTACT TIME | Pb REMAINING IN SOLUTION (PPM METAL) |
|---|---|
| 0 | 2000 |
| 10 sec | 1250 |
| 1 min | 935 |

TABLE 8-continued

| CONTACT TIME | Pb REMAINING IN SOLUTION (PPM METAL) |
|---|---|
| 5 min | 80 |
| 15 min | 4 |
| 60 min | not det. |

Much like small pored zeolite A, while lead removal was achieved, its rate of removal would dictate contact times too great for the rapid stripping needed in short contact time purification processes.

EXAMPLE 6

This example demonstrates the efficient and rapid removal of substantial quantities of lead from solution by wide pored titanium-silicate molecular sieve ETS-10. The rates observed may be sufficient for short contact time processes.

Approximately 100 bed volumes of 2,000 ppm lead solution was exposed to the ion exchanger in a pre-acidified (nitric acid) condition, in order to preclude hydrolysis as a means of lead extraction. This amount of lead added was gauged to yield a loading of approximately 10 wt. % Pb on the air-equilibrated (i.e., hydrated) sample, if the lead were completely "adsorbed".

Two and four-tenths (2.4) gram samples of air-equilibrated ETS-10 were equilibrated with 50 grams of pre-acidified solution so as to generate a solution pH of approximately 6, and stirred with a magnetic stirrer. To these "neutralized" mixtures were added 50 grams lots of 4000 ppm Pb solution (as $Pb(NO_3)_2$). The lead/"adsorbent" mixtures were stirred using a magnetic stirrer for predetermined time intervals and then rapidly vacuum filtered to separate the "adsorbent" from the "purified" solution. Lead concentrations remaining in the "purified" solutions after various contact times are presented as Table 9.

TABLE 9

| CONTACT TIME | Pb REMAINING IN SOLUTION (PPM METAL) |
|---|---|
| 0 | 2000 |
| 10 sec | 8 |
| 1 min | 5 |
| 5 min | 3 |
| 15 min | not det. |
| 60 min | not det. |

More than 99.5% of the lead was removed within 10 seconds. In bed configuration as would be found in an end use home lead filter, high throughputs of essentially lead free purified water would appear possible.

EXAMPLE 7

This example demonstrates the complete and rapid removal of substantial quantities of lead from solution by a derivative of the ETS-10 structure, ETAS-10, essentially on contact. This complete, essentially instantaneous "purification" is ideally suited to short contact time processes such as end use lead filters.

Approximately 100 bed volumes of 2,000 ppm lead solution was exposed to the ion exchanger in a pre-acidified (nitric acid) condition, in order to preclude hydrolysis as a means of lead extraction. The amount of lead added was gauged to yield a loading of approximately 10 wt. % Pb on the air-equilibrated (i.e., hydrated) sample, if the lead were completely "adsorbed".

Two and four-tenths (2.4) gram samples of air-equilibrated ETAS-10 were equilibrated with 50 grams of pre-acidified solution so as to generate a solution pH of approximately 6, and stirred with a magnetic stirrer. To these "neutralized" mixtures were added 50 grams lots of 4000 ppm Pb solution (as $Pb(NO_3)_2$). The lead/"adsorbent" mixtures were stirred using a magnetic stirrer for predetermined time intervals and then rapidly vacuum filtered to separate the "adsorbent" from the "purified" solution. Lead concentrations remaining in the "purified" solutions after various contact times are presented as Table 10.

TABLE 10

| CONTACT TIME | Pb REMAINING IN SOLUTION (PPM METAL) |
|---|---|
| 0 | 2000 |
| 10 sec | 2 |
| 1 min | not det. |
| 5 min | not det. |
| 15 min | not det. |
| 60 min | not det. |

Lead removal was noted to be essentially complete upon contact. Such a material would essentially completely strip lead from passing streams without significant contact time limitations.

SUMMARY OF EXAMPLES 5-7

While all materials tested exhibit the ability to evacuate all available lead from solution, even under acidified conditions which preclude hydrolysis as a mechanism of action, ETS-4 appears too slow for short contact time applications. The large pored materials based on the ETS-10-type crystalline structure, especially ETAS-10, remove lead from solution completely and with remarkable speed. This is exactly what is required for short contact time applications such as end use home water filters.

Conclusions: Lead decontamination of drinking waters has become a prime societal concern. No prior art adsorbents offer lead stripping rates sufficient to make end use fast flow water purification systems possible Lack of such materials may force massive societal intrusion and expense to correct the "lead problem". ETS-10 and derivatives of its crystalline structure appear to fill this need for lead and other heavy metals decontamination concerns.

EXAMPLES 8-9

In the Examples which follow, two series of tests were conducted to determine the lead removal properties of ETS-10 type materials at low (in the ppb range) lead concentration for at the faucet drinking water applications.

The first series was conducted in a batch reactor and two series of tests were carried out; one with deionized water and one with tap water.

Three adsorbents, ETAS-10, Zeolite Y and Zeolite L were tested in said batch reactor. All adsorbents were in the powdered form and were tested under the following test conditions:

| Adsorbent, gr* | 0.015 |
|---|---|
| Lead in solution, ppb | 150 and 1500 |
| Solution, gr | 1000 |
| Solid/Liquid Ratio | 1/66,667 |
| Loading | 1% and 10% |
| Water Source | Deionized Water or Tap Water |

*Weight determined after air equilibration.

After 5 minutes and 1 hour mixing times, the solutions were filtered to remove absorbent and tested for lead concentration with a colorimeter commercially available under the trade name "Leadtrack DR 100". The following table lists lead concentration in the solution vs. time:

TABLE 11

Lead removal of ETAS-10 vs Zeolite - Batch Reactor

| | Mixing Time | | | |
|---|---|---|---|---|
| | 5 min | 1 hour | 5 min | 1 hour |
| Lead in Starting Solution, ppb | 150 | 150 | 1500 | 1500 |
| EXAMPLE 8 | | | | |
| Lead Remained in Solutions, ppb | Test with Deionized Water | | | |
| ETAS-10 | 25 | 13 | 18 | 13 |
| Zeolite Y | 80 | 5 | 150[1] | 40 |
| Zeolite L | 125 | 125 | 150 | 120 |
| EXAMPLE 9 | | | | |
| Lead Remained in Solutions, ppb | Test with Tap Water | | | |
| ETAS-10 | 125 | 63 | >150 | >150 |
| Zeolite Y | 150 | 150 | >150 | >150 |
| Zeolite L | 150 | 150 | >150 | >150 |

[1]The detection limit range is 2-150 ppb Pb.

The data in the above table show that:

ETAS-10 removes lead faster than Zeolite Y and Zeolite L at both 150 ppb and 1500 ppb lead concentrations in the deionized water starting solution wherein the lead is calculated.

Similar results are seen for 150 ppb Pb tap water. While the lead removal performances of ETAS-10 for the 150 ppb Pb tap water is not as effective as for deionized water, both zeolites Y and L are not effective at all. This shows that ETAS-10 has better lead selectively than zeolites Y and L in water containing competing cations such as calcium and magnesium. Typically, a 150 ppb Pb tap water contains:

| | Pb | Ca | Mg |
|---|---|---|---|
| Ion Concentration | 150 ppb | 250 ppm | 150 ppm |
| No. of Equivalent Atoms | 1 | 8600 | 8600 |

Thus in a 150 ppb Pb tap water solution, one atom of Pb will have to compete with 17200 atoms of Ca and Mg.

No conclusion can be drawn with the 1500 ppb Pb tap water solution. The lead concentrations remaining in the solution for all tested materials are higher than the detection limit of the test apparatus.

Overall, the lead removal property and selectivity of ETAS-10 in a batch reactor with deionized and tap water are better than both zeolites Y and L. However, for a continuous system such as the under the faucet drinking water application, these data are not sufficient because the liquid-solid contact time in this system is in the range of seconds, not minutes, as shown in the above table.

EXAMPLE 10

To determine the lead removal rate of ETAS-10 for at the faucet drinking water application, a series of experiments were conducted in a fixed bed reactor using the same tap water employed in Example 9.

|  | Test Conditions Actual |
|---|---|
| Adsorbent, Gr* | 16 |
| Lead in solution, ppb | 150 |
| pH, | 7.5 +/− 0.5 |
| Solution flow rate, cc/min | 1000 |
| Space time, gr. min/cc | 0.016 |
| Water source | 16000 cc Tap Water |

*Weight determined after air equilibration.

Four adsorbents were tested: ETAS-10, zeolite Y, zeolite A, and activated carbon. ETAS-10 is minus 100 plus 400 size (U.S. Sieve) screen aggregates. Zeolite Y is minus 100 plus 325 size (U.S. Sieve) screen microspheres in the sodium form. Zoelite A is 1/16″ extrudates which are commercially available. Influent solution containing 150 ppb Pb was prepared with tap water. Effluent samples were taken at the 1, 5, 10, and 15 minute marks. The following table lists test conditions and lead in the effluents vs time for all adsorbents:

TABLE 9

| Test Conditions and Lead in the Effluents Tap Water Was Used | | | | |
|---|---|---|---|---|
|  | ETAS-10 | Zeolite Y | Zeolite A | Activated Carbon |
| Adsorbent |  |  |  |  |
| Weight, gr* | 16 | 16 | 16 | 16 |
| Form | Aggregates | Microspheres | Extrudates | Aggregates |
| Size | 100/400 | 100/375 | 1/16″ | 20/50 |
| Starting Ph[1] | 10.3 | 8.6 | 8.6 | 8.2 |
| Final pH[2] | 7.1 | 7.2 | 7.2 | 7.2 |
| Influent Solution |  |  |  |  |
| Pb Conc, ppb | 150 | 150 | 150 | 150 |
| Flow Rate cc/Min | 1000 | 1000 | 1000 | 1000 |
| Volume, cc | 16000 | 16000 | 16000 | 16000 |
| Effluent Lead Concentration, ppb[3] |  |  |  |  |
| After 1 min | <2 | 20 | — | 80 |
| After 5 min | <2 | 40 | 55 | 90 |
| After 10 min | <2 | 40 | — | 95 |
| After 15 min | <2 | 35 | 95 | 93 |

*Weight determined after air equilibration.
[1]pH of 16 gr adsorbent/200 cc tap water
[2]equilibrated pH of 16 gr adsorbent/200 cc tap water with 0.1 N $HNO_3$
[3]2 ppb is detection limit of the test apparatus Pb concentration in the effluent of a fixed bed reactor containing 100/400 mesh ETAS-10 clearly meets the 20 ppb maximum effluent lead concentration set by the National Sanitation Foundation—Drinking Water Treatment Units, and the proposed 5 ppb maximum Pb contaminant level by the EPA on Aug. 3, 1988.

100/400 mesh ETAS-10 has better Pb selectivity than zeolite A, zeolite Y and activated carbon. While lead in the effluents of zeolite A, zeolite Y, and activated carbon increases with time, it remains constant for ETAS-10. The increase of Pb in the effluents vs time for zeolites A and Y is probably due to the effective loss of active sites when Ca and Mg are adsorbed on these materials.

EXAMPLE 11

A $TiCl_4$ solution was prepared by mixing and blending the following reactants with an magnetic stirrer:

| Conc. HCl | 3221 g |
|---|---|
| $TiCl_4$ | 1480 g |
| Deionized $H_2O$ | 1299 g |

An alkaline silicate solution was prepared by mixing and blending the following reactants with an overhead stirrer:

| N ® Brand sodium silicate | 5580 g |
|---|---|
| NaOH | 1460 g |
| KF | 416 g |
| Deionized $H_2O$ | 308 g |

A portion of the $TiCl_4$ solution (3,456 g) was mixed and blended with the entirety of the alkaline silicate solution using an overhead stirrer. To this mixture, 376 g of Satintone ® No. 2 metakaolin was added and the mixture was thoroughly blended using an overhead stirrer until the resulting gel appeared homogeneous. To this gel was added 54.0 grams of ETAS-10 seeds which had been alcined at 350°–500° C. The gel was again blended using an overhead stirrer until it appeared homogeneous.

To the above gel, 1000 grams of deionized water was added while it was being mixed, using an overhead stirrer in order to produce a gel having a viscosity of about 500–1000 centipoises (Brookfield).

The gel was spray-dried using a Stork-Bowen nozzle dryer at the following conditions:

| outlet temperature | 130–135° C. |
|---|---|
| inlet temperature | 370° C. |
| feed rate | 300 ml/min. |
| pressure drop | 5.5 psi |
| nozzle number | 08 |

The product yield was 3530 grams of fluidizable microspheres largely in a size range of minus 60 plus 325 (U.S. Sieve) having the following molar ratios:

Si/Ti = 6.85

Al/Ti = 0.88

The microspheres were calcined in air at 400° C. for approximately one hour.

One kilogram of the calcined microspheres was mixed with an equal weight of an aqueous solution containing 2.0 wt. % NaOH and 1.0 wt. % KOH. The mixture was autoclaved under autogenous pressure without stirring at 200° C. for 24 hours. The crystallized product was wet screened to minus 100 plus 325 size (U.S. Sieve) to yield 300 grams of product.

The screened product was boiled for 15 minutes in two liters of deionized water, vacuum filtered and dried at 125° C. for two hours.

Powder X-ray analysis indicated that ETAS-10 was formed of about 70% crystallinity.

The microspheres were subjected to the test procedure set forth in Example 10 with the exception that the tap water contained:

|  | Pb | Ca | Mg |
|---|---|---|---|
| Low Concentration | 150 ppb | 53 ppb | 12 ppb |
| No. of Equivalent | 1 | 1800 | 700 |

The tap water had a pH of 6.5–7.5 so that no pH adjustment was necessary. After a 15-minute equilibration period, no measurable lead (<2 ppb) was detected in the effluent. (This test will be referred to as the "short" test.)

In addition to the above "short" test, the microspheres were subjected to a more severe lead removal test for a longer duration.

In this test, 40 cc (20 grams) of the microspheres were placed into a chamber having a height of 2¼ inches and an inside diameter of 2 inches. The balance of the chamber was filled with glass wool.

Tap water identical with that used in the "short" test was passed through said chamber at a flow rate of 3 liters per minute. The effluent lead concentration was determined for every 25 gallons of tap water passing through said chamber utilizing the colorimeter previously described as being commercially available under the trade name "Leadtrack DR100". The results obtained were as follows:

| Lead in the Effluent vs Volume of Water | |
|---|---|
| Water Volume, Gal. | Pb in Effluent, ppb |
| 0 | 150 |
| 25 | 1 |
| 50 | 5 |
| 75 | 5 |
| 100 | 6 |
| 125 | 6 |
| 150 | 9 |
| 175 | 7 |
| 200 | 9 |

As can be seen, excellent results were obtained even after treatment of 200 gallons.

EXAMPLE 12

Preparation Procedure of ETAS-10/Attagel-36 ® Aggregates

ETAS-10 powder was prepared by the following procedure and formulated into aggregates.

A TiCl$_4$ solution was prepared by mixing and blending the following reactants with a magnetic stirrer:

| Conc. HCl | 1610.7 g |
|---|---|
| TiCl$_4$ | 739.8 g |
| Deionized H$_2$O | 649.5 g |

An alkaline silicate solution was prepared by mixing and blending the following reactants with an overhead stirrer.

| SDS silicate | 3487.5 g | (14.4 wt. % Na$_2$O & 27.1 wt. % SiO$_2$) |
|---|---|---|
| NaOH | 556.3 g | |
| KF | 261.0 g | |

A portion of the TiCl$_4$ solution (2160.0 g) was mixed and blended with the entirety of the alkaline silicate solution using an overhead stirrer To this mixture a solution of sodium aluminate, prepared by dissolving 115.3 g of NaAlO$_2$ in 393.8 g deionized H$_2$O, was added and blended. To this mixture was added 33.8 grams of ETAS-10 seeds. The mixture was thoroughly blended using an overhead stirrer until it appeared homogeneous. The gel was then placed in a Waring Blendor ® and blended for 10 minutes. The "pH" of the gel using our standard 100:1 dilution technique was found to be 10.9 after a 15 min. equilibration period. The mixture was autoclaved under autogenous pressure without stirring at 200° C. for 24 hours. The product was washed with deionized (DI) H$_2$O, vacuum filtered and dried at 200° C. to yield ETAS-10 powder.

The following materials were used to prepare the aggregates:

| 500 g | ETAS 10 powder |
|---|---|
| 55 g | Attagel ® 36 |
| 111 g | Starch (Penford ® Gum 280 - Penick and Ford, Limited) |
| Deionized Water | 370 grams |

A starch solution, added as a pore-former, was prepared by mixing 111 g of the above starch with 320 g deionized water and cooking in a steamer at 212° F. for 20 minutes. This step was used to: (a) completely dissolve starch in water; and (b) improve starch/water rheologies. The cooked starch was cooled to room temperature before being used as the binder for the formation of ETAS-10/Attagel-36 ® aggregates.

Attagel-36 ® is a commercially available colloid grade Attapulgite clay. The dehydration temperature of Attagel-36 ® is less than the critical temperature of ETAS-10 (1020°–1110° F.). Typical analysis of Attagel-36 is:

68.0 wt. % SiO$_2$
12.0 wt. % Al$_2$O$_3$
10.5 wt. % MgO
5.0 wt. % Fe$_2$O$_3$
1.7 wt. % CaO
1.0 wt. % P$_2$O$_5$
1.0 wt. % K$_2$O
0.7 wt. % TiO$_2$

The strong particle integrity of Attagel-36 ® results in the high attrition resistance of the ETAS-10 Attagel-36 ® aggregates.

The aggregates were prepared by blending 500 g ETAS-10 with 55 g Attagel-36 ® in a single speed sigma blade mixer for 15 minutes. When the blend was uniformly mixed (about 10 minutes), 430 g cooked starch and 50 g deionized water was added to the blend and mixed for another 20 minutes.

The ETAS-10/Attagel-36 ®/Starch blend had a dough-like consistency and were molded into several 2-3 inches diameter cakes and placed in an open cordierite tray before calcination. The calcination was conducted in a muffle furnace at 435° F. for 60 minutes, then 660° F. for 60 minutes, and finally 900° F. for 75 minutes. The slow calcination of the blend was used to prevent the fast oxidation of starch which might result in large temperature increases during the calcination step.

Finally, the light brown ETAS-10/Attagel-36 ® cakes were crushed and wet screened to minus 20 plus 60 mesh (U.S. Sieve) before the sample was tested for lead removal properties. The final product had a surface area by mercury porosimetry of 25.7 m$^2$/g, a bulk density of 0.45 g/ml and a pore volume of 0.89 cc/g.

The lead removal properties were determined by the "short" test procedure of Example 11 and the effluent was found to contain 26 ppb of lead after 15 minutes equilibration.

In addition to the "short" test, the above aggregates were subjected to a lead removal test of longer duration.

Into the chamber previously described in Example 11 were placed 100 cc (67 g) of said aggregates. No glass wool was used. Tap water as described in Example 11 was passed through the chamber at a flow rate of 1 liter per minute. The effluent lead concentration was determined for every 10 gallons of tap water by the method previously described. The results obtained were as follows:

| Lead in the Effluent vs. Volume of Water | |
|---|---|
| Water Volume, gal. | Pb in Effluent, ppb |
| 0 | 150 |
| 10 | 13 |
| 20 | 18 |
| 30 | 15 |
| 50 | 16 |
| 60 | 13 |

What is claimed is:

1. A process for the removal of heavy metals from aqueous solutions thereof containing one or more of said heavy metals as well as competing ions including calcium and/or magnesium which comprises contacting said aqueous solution with a crystalline molecular sieve having the X-ray diffraction pattern of either ETS-10 or ETAS-10, until such heavy metals are substantially removed from said aqueous solution.

2. The process of claim 1 wherein said crystalline molecular sieve is ETAS-10.

3. The process of claim 2 wherein said heavy metals are selected from the group consisting of lead, cadmium, zinc, chromium, arsenic and mercury.

4. The process of claim 1 wherein said crystalline molecular sieve is ETS-10.

5. The process of claim 4 wherein said heavy metals are selected from the group consisting of lead, cadmium, zinc, chromium, arsenic and mercury.

6. A process for the removal of lead from an aqueous solution thereof containing competing cations including calcium or magnesium which comprises contacting said aqueous solution with a crystalline molecular sieve having the X-ray diffraction pattern of ETS-10 or ETAS-10.

7. The process of claim 6 wherein said molecular sieve is ETAS-10.

8. The process of claim 7 wherein said ETAS-10 is in the as-synthesized form.

9. The process of claim 6 wherein said molecular sieve is ETS-10.

10. The process of claim 9 wherein said ETS-10 is in the as-synthesized form.

* * * * *